Nov. 12, 1940.   J. F. WALLACE   2,221,121
FLUID MOTOR
Filed Dec. 17, 1937
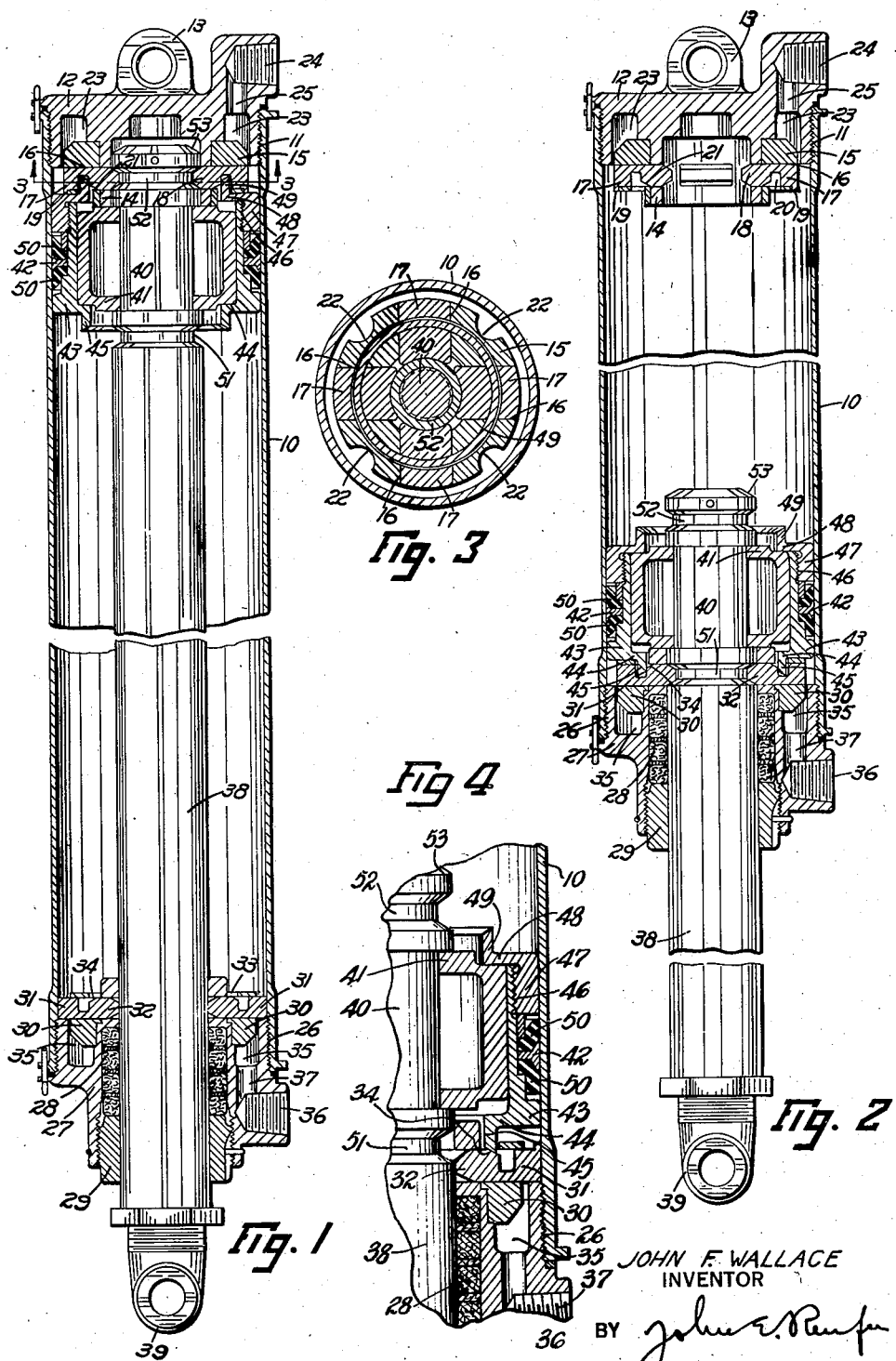
JOHN F. WALLACE
INVENTOR
BY
ATTORNEY Patented Nov. 12, 1940

2,221,121

UNITED STATES PATENT OFFICE 2,221,121

FLUID MOTOR

John F. Wallace, Shaker Heights, Ohio, assignor to The Cleveland Pneumatic Tool Company, Cleveland, Ohio, a corporation of Ohio Application December 17, 1937, Serial No. 180,313

9 Claims. (Cl. 121—40)

This invention relates broadly to fluid actuated motors, but more particularly to that type of mechanism incorporated in an airplane for raising or lowering the landing gear thereof.

One object of this invention is to produce a fluid actuated motor including a cylinder having a fluid actuated piston reciprocable therein, with means for automatically locking the piston at the end of its strokes, thereby preventing the accidental axial movement of the piston relative to its cylinder and the consequential collapse of the landing gear in the event of a failure of the fluid pressure within the cylinder.

Another object of this invention is to produce a fluid motor of simple construction forming a compact and light assembly which is strong, durable and efficient.

In the drawing:

Fig. 1 is a longitudinal sectional view of a fluid motor embodying the invention shown in retracted position.

Fig. 2 is a view similar to Fig. 1 showing the motor in extended position.

Fig. 3 is a cross sectional view taken in a plane indicated by line 3—3 in Fig. 1.

Fig. 4 is an enlarged longitudinal sectional view of a portion of the lower end of the motor, illustrating the locking device about to be driven into operative position.

Referring to the drawing in which like symbols designate corresponding parts throughout the several views, 10 represents a hollow cylinder having its upper end internally threaded as at 11 to receive a head member 12 formed with a bracket 13 for connection to the fuselage of an airplane. Depending from the head 12, there is a sleeve 14 having rigidly mounted on the exterior thereof a ring 15 formed with four radially extending slots 16 equally spaced from each other. The slots 16 also extend through the sleeve 14, and each has a detent or dog 17 slidable therein with a tapered end 18 movable into and out of the interior of the sleeve 14, and a step 19 engageable with the exterior of the ring for limiting its inward movement. The ring 15 is also formed with an annular groove 20 opening into the cylinder 10 and extending across the dogs 17. Normally this groove is of a U-shape cross section, but in the dogs 17, the inner side wall of the groove is tapered as at 21. Externally, the ring 15 is provided with longitudinally disposed grooves or passages 22 affording communication between the upper end of the cylinder 10 and an annular chamber 23 formed within the head 12, which chamber communicates with a fluid conduit connection 24 through a passage 25.

The lower end of the cylinder is also threaded as at 26 to receive a head or bearing member 27, which contains a stuffing box including packings 28 and an adjustable nut 29. On the head 27 is also secured a ring 30 which is similar to the ring 15 above described. This ring also carries slidable detents or dogs 31 formed with a tapered inner end 32, and has an annular groove 33 also extending across the dogs 31. The groove 33 is similar to the groove 20, with its inner side wall within the dogs 31 tapered as at 34. On the external wall of the ring 30, there are passages not shown which are similar to the passages 22 to afford communication between the lower end of the cylinder and an annular chamber 35 formed within the head 27, which chamber communicates with a fluid conduit connection 36 through a passage 37.

Slidable through the lower head 27, there is a piston-rod 38 having its outer end formed with a bracket 39 for connection to the landing gear of an airplane. Toward its end, the piston-rod is formed with a reduced portion or neck 40 having a collar 41 rigidly secured thereon.

Slidably mounted on the collar 41, there is a piston generally designated by 42 and comprising a head 43 formed with an inturned flange 44 engageable with the collar 41 for limiting axial movement of the piston in one direction. From the flange 44 depends a short sleeve or annular step 45 adapted to fit into the groove 33 of the ring 31. The piston head is threaded as at 46 to receive a cap 47 also formed with an inturned flange 48 engageable with the collar for limiting slidable movement of the piston in the other direction. Extending from the flange 48, there is an annular step 49 adapted to fit into the annular groove 20 of the upper ring 15. The distance between the piston inturned flanges 44 and 48 is somewhat greater than the length of the collar 41, allowing limited axial movement of the piston relative to the collar. Clamped between the piston head 43 and its companion cap 47, there are packings 50 affording fluid tight joint between the piston and the inner wall of the cylinder 10.

On each side of the collar 41, the piston-rod is provided with a V-shaped annular groove 51 and 52 respectively, while the extreme inner end of the piston-rod is tapered as at 53.

In operation, the motor above described is mounted on an airplane with the bracket 13 connected to the fuselage of the airplane while the bracket 39 is connected to the landing gear. To the connections 24 and 36 are attached motive fluid conveying conduits for admitting motive fluid into the cylinder 10 from a source of supply such as a pump, reservoir or the like. These conduits, are preferably controlled by a suitable valve mechanism whereby motive fluid may be admitted through one of the conduits and free to exhaust through the other. As shown in Fig. 1, the motor is in retracted position with the tapered ends 18 of the dogs 17 located into the V-shaped groove 52, thereby preventing axial movement of the piston-rod 38 relative to the cylinder 10. In this instance, it will also be noted that the annular step 49 of the piston 42 is located into the annular groove 20 formed within the ring 15 and extending across the dogs 17, thereby preventing the accidental lateral movement or release of the dogs 17 relative to the piston-rod 38. When motive fluid is admitted into the connection 24, it will flow through the passage 25 into the annular chamber 23, and therefrom on the cap 47 of the piston 42 through the passages 22. The motive fluid thus acting on the piston 42, will cause the latter to move axially relative to the piston-rod 38 until the inturned flange 48 engages the collar 41. During this movement of the piston relative to the piston-rod, the annular step 49 will move out of the annular groove 20 for allowing the lateral movement or release of the dogs 17. As the inturned flange 48 of the piston 42 engages the collar 41, the motive fluid will also be admitted on the adjacent upper end wall of the collar 41, thereby cooperating with the piston for imparting axial movement to the piston-rod 38, causing the upper side wall of the V-shaped groove 52 to act on the tapered ends 18 of the dogs 17 for automatically effecting the release of the dogs.

During the downward movement in Fig. 1 of the piston-rod 38, the motive fluid previously admitted into the cylinder 10 between the piston 42 and the lower head 27, is free to exhaust through the connection 36. As the piston rod 30 approaches the end of its downward stroke, the piston 42 is positioned as shown in Fig. 4 relative to the collar 41, that is with the inturned flange 48 resting on the collar 41, thereby causing the annular step 45 of the piston 42 to engage the inclined side wall 34 of the annular groove 33 of the dogs 31. In this instance, the annular groove 51 of the rod 38 being not yet aligned with the dogs 31, the piston 42 having motive fluid acting thereon will momentarily remain stationary while drivingly acting on the dogs in an effort to move them inwardly. Simultaneously, the piston rod 38, due to the action of the motive fluid on the upper end wall of its collar 41, will continue in its downward movement until the groove 51 is positioned in alignment with the dogs 31, in which instance, the dogs 31, due to the driving action of the piston annular flange 48 on the inclined side wall 34, will be driven into the annular groove 51 for locking the piston rod 38 against axial movement relative to the cylinder 10. As the dogs are driven inwardly into the groove 51 of the rod 38, the portion of the groove 33 within the dogs 31 will move into alignment with the rest of the groove within the ring 30, thereby enabling the piston 42 to move into the position shown in Fig. 2, with its annular step 45 located within the annular groove 33 for preventing accidental lateral movement or release of the dogs.

When it is desired to retract or collapse the motor, motive fluid may be admitted into the connection 36 and exhausted through the connection 24. In this instance, the motive fluid from the connection 36 will flow into the annular chamber 35 through the passage 37, and from the chamber 35 on the piston head 35 through passages, not shown, which are similar to the passages 22 and are provided on the peripheral wall of the ring 30. The motive fluid acting on the piston head 43 will effect the axial movement of the piston 42 relative to the collar 41 until the inturned flange 44 engages the collar 41. This initial movement of the piston will cause its annular step 45 to move out of the annular groove 33 for allowing the lateral movement of the dogs 31. Thereafter, the motive fluid acting on the lower face of the piston 42 will also be admitted on the adjacent lower face of the collar 41, thereby cooperating with the action of the lower inturned flange 44 of the piston on the collar 41 for driving the rod 38 upwardly, thus resulting in the lower inclined side wall of the V-shaped annular groove 51 to act on the tapered end 32 of the dogs 31 for automatically effecting the release of the dogs.

During the upward movement in Fig. 2 of the piston rod 38, the motive fluid previously admitted into the cylinder 10 between the piston 42 and the upper head 12, is free to exhaust through the connection 24. As the piston rod 38 reaches the end of its upward stroke, the annular step 49 of the piston 42 will exert pressure on the inclined side wall 21 of the annular groove 20 within the dogs 17, tending to move the dogs inwardly. However, since the V-shaped annular groove 52 of the rod 38 is not yet in alignment with the dogs 17, the piston will momentarily remain stationary while the rod 38, due to the action of the motive fluid on the lower end wall of the collar 41, proceeds upwardly. When the groove 52 is finally in alignment with the dogs 17, the dogs will be driven into the groove as above explained in connection with the dogs 31 and groove 33, thereby locking the piston rod 38 at the end of its inward stroke. As the dogs 17 are driven inwardly, the portion of the groove 20 within the dogs will also move into alignment with the rest of the groove within the ring 15, thereby enabling the piston 42 to move into the position shown in Fig. 1, with its annular step 49 located within the annular groove 20 for preventing accidental lateral movement or release of the dogs.

When the piston rod 38 is away from the upper head member 12, it is possible for the dogs 17 carried by this upper head to accidentally assume the position shown in Fig. 2. In this instance, during the upward movement in Fig. 2 of the piston-rod 38, the inner tapered end 53 of the piston-rod will first engage the tapered end 18 of the dogs 17, for driving the dogs outwardly to allow the free passage of the inner end of the piston-rod 38 into the sleeve 14 of the upper head 12.

From the foregoing description, it will be understood that when the piston rod 38 has reached either end of its strokes, it is automatically locked against axial movement relative to the cylinder 10. In this instance, the piston 42 will remain into operative position relative to the dogs 17 or 30 due to the frictional resistance between the piston and the inner wall of the cylinder 10, thereby having its operative engagement with the dogs 17 or 30 unaffected by a failure of the motive fluid pressure into the cylinder 10.

Although the foregoing description is necessarily of a detailed character, in order to completely set forth the invention, it is to be understood that the specific terminology is not intended to be restricted or confining and it is to be further understood that various rearrangements of parts and modifications of structural detail may be resorted to without departing from the scope or spirit of the invention as herein claimed.

I claim:

1. In a fluid motor, an elongated casing having motive fluid admitted therein, a piston and piston-rod subjected to the pressure of said motive fluid for reciprocation within said casing, said piston and rod being capable of limited relative axial movement, locking means between said casing and rod including a recess on said rod, a detent carried by said cylinder adapted to extend into said recess for preventing relative reciprocation between said cylinder and rod when said rod reaches the end of its stroke in one direction and automatically releasable upon movement of said piston and rod in the other direction, and means on said piston drivingly engaging said detent during said relative axial movement for shifting it into said recess.

2. In a fluid motor, an elongated casing, a rod within said casing extending to the exterior thereof, a fluid actuated reciprocable piston within said casing mounted on said rod for transmitting reciprocation thereto, said piston and rod being capable of limited relative axial movement, a releasable lock between said casing and rod including a recess on said rod, a detent carried by said casing adapted to extend into said recess for preventing relative reciprocation between said casing and rod, means on said piston engageable with said detent for shifting the same into operative position during said relative axial movement in one direction, and means on said rod responsive to the initial movement of said piston and rod in the other direction for automatically effecting the release of said detent.

3. In a fluid motor, a cylinder, a rod reciprocable therein, means admitting motive fluid into said cylinder for actuating said rod, a lock for said rod including a detent carried by said cylinder inwardly slidable into operative engagement with the rod for locking the rod at one end of its stroke, and a motive fluid actuated reciprocable piston within said cylinder normally assisting in the reciprocation of said rod and drivingly acting on said detent near the aforesaid end of said stroke for effecting the operative engagement thereof with said rod.

4. In a fluid motor, a pair telescopically mounted elements, a lock between said elements including a detent carried by one of said elements radially slidable inwardly into operative engagement with the other element for preventing relative movement therebetween, and fluid actuated means between said elements engageable with said detent for effecting its inward slidable movement.

5. A fluid actuated motor including a cylinder, a rod telescopically therein, a locking mechanism for locking the rod at the end of one of its strokes including a recess on the rod, a detent carried by the cylinder adapted to extend into said recess, and means on said rod movable in one direction for shifting and holding said detent in said recess and in the other direction to enable said detent to move out of said recess.

6. A fluid actuated motor including a cylinder, a rod telescopically therein, a piston on the rod capable of limited slidable movement relative thereto, a locking mechanism between said cylinder and rod for locking the rod at the end of one of its strokes including a recess on said rod, a detent carried by the cylinder capable of extending into said recess, and interengageable surfaces on said piston and detent exerting during said relative slidable movement an inward camming action on said detent effecting its extension into said recess.

7. A fluid actuated motor including a cylinder, a rod telescopically therein, a double-acting sleevelike piston on the rod capable of limited slidable movement relative thereto, a locking member carried by the cylinder engageable with the rod for locking it at the end of one of its strokes, and interengageable camming means on said piston and member operable by virtue of the relative slidable movement between said rod and piston for effecting operative engagement of said member with said rod.

8. In a fluid actuated motor, an elongated casing, a fluid actuated piston and rod reciprocable within said casing, said piston and rod being capable of limited axial relative movement, passages for admitting motive fluid into said casing for actuating said piston and rod, a locking member within one end of said casing slidable radially relative thereto into operative engagement with said rod for preventing its reciprocation and capable of release to enable said reciprocation, interengageable camming means on said member and piston operable by virtue of said axial relative movement for automatically effecting operative engagement of said member with said rod near the end of the stroke of said rod in one direction, and camming means on said rod and member operable upon initial movement of said rod in the other direction for effecting said release.

9. A fluid actuated motor including inner and outer telescoping elements, a stationary head within one end of the outer element, a locking member within said head slidable radially into operative engagement with the inner member for preventing telescopic movement of said elements and capable of release to enable said movement, a sleeve carried by the inner element capable of limited axial movement relative thereto, an inclined surface on said sleeve engageable with said member near the end of the stroke of said inner element for automatically effecting said operative engagement, and an inclined surface on said inner element engageable with said member for effecting said release upon initial movement of the inner element in the other direction.

JOHN F. WALLACE.